(12) United States Patent
Bello et al.

(10) Patent No.: US 7,222,116 B2
(45) Date of Patent: May 22, 2007

(54) METHOD AND SYSTEM FOR MATCHING COMPLEX CUSTOMER REQUIREMENTS WITH PROVIDER SOLUTIONS

(75) Inventors: Stephen E. Bello, Austin, TX (US); Tze-Rong Fu, Coppell, TX (US); Kevin P. McAuliffe, Cortlandt Manor, NY (US); John F. Palmer, Scarsdale, NY (US); Emily C. Plachy, Pleasantville, NY (US); Kathryn Priest Reece, Marietta, GA (US); David U. Shorter, Lewisville, TX (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 10/059,511

(22) Filed: Jan. 29, 2002

(65) Prior Publication Data

US 2003/0145016 A1 Jul. 31, 2003

(51) Int. Cl.
*G06F 17/30* (2006.01)
(52) U.S. Cl. .......................................................... 707/3
(58) Field of Classification Search ............. 707/104.1, 707/3; 705/1
See application file for complete search history.

(56) References Cited

U.S. PATENT DOCUMENTS

| 5,630,125 | A | * | 5/1997 | Zellweger ................ 707/103 R |
| 5,890,175 | A | | 3/1999 | Wong et al. |
| 5,895,454 | A | | 4/1999 | Harrington |
| 5,970,475 | A | | 10/1999 | Barnes et al. |
| 6,112,181 | A | | 8/2000 | Shear et al. |
| 6,131,087 | A | | 10/2000 | Luke et al. |
| 6,141,653 | A | | 10/2000 | Conklin et al. |
| 6,154,738 | A | * | 11/2000 | Call ............................... 707/4 |
| 6,226,675 | B1 | | 5/2001 | Meltzer et al. |
| 6,233,566 | B1 | * | 5/2001 | Levine et al. ............. 705/36 R |
| 6,442,528 | B1 | * | 8/2002 | Notani et al. .................. 705/9 |
| 6,789,252 | B1 | * | 9/2004 | Burke et al. ................. 717/100 |
| 6,980,966 | B1 | * | 12/2005 | Sobrado et al. ............... 705/26 |
| 2001/0047276 | A1 | * | 11/2001 | Eisenhart ....................... 705/1 |
| 2001/0049615 | A1 | * | 12/2001 | Wong et al. .................... 705/8 |
| 2001/0056398 | A1 | * | 12/2001 | Scheirer ...................... 705/38 |
| 2002/0091923 | A1 | * | 7/2002 | Chipman et al. ........... 713/168 |
| 2002/0128890 | A1 | * | 9/2002 | Dick et al. ...................... 705/8 |
| 2002/0138317 | A1 | * | 9/2002 | Mok et al. ...................... 705/7 |
| 2002/0147622 | A1 | * | 10/2002 | Drolet et al. ................... 705/7 |
| 2003/0084125 | A1 | * | 5/2003 | Nagda et al. ................ 709/219 |
| 2003/0115115 | A1 | * | 6/2003 | Ouchi .......................... 705/27 |
| 2004/0181606 | A1 | * | 9/2004 | Astor et al. ................. 709/238 |

* cited by examiner

*Primary Examiner*—Etienne P. LeRoux
*Assistant Examiner*—Cindy Nguyen
(74) *Attorney, Agent, or Firm*—James D. Palmer; Hoffman, Warnick & D'Alessandro LLC

(57) ABSTRACT

A method and system for forming and procuring an integrated solution to meet a set of requirements. The invention includes an electronic exchange for providing an information technology (IT) solution, comprising: a matching system for matching IT requirements with a set of candidate IT components that provide the IT solution; a supplier exchange system for interfacing with suppliers of the set of candidate IT components; and an exchange catalog for storing information relating to available IT components, including supplier information.

28 Claims, 3 Drawing Sheets

METHOD AND SYSTEM FOR MATCHING COMPLEX CUSTOMER REQUIREMENTS WITH PROVIDER SOLUTIONS

BACKGROUND OF THE INVENTION

1. Technical Field

The present invention relates generally to an electronic exchange for providing integrated solutions, and more particularly relates to a dynamic system for matching complex customer requirements with provider solutions.

2. Related Art

As business and technical systems become more and more complex, providing automated solutions for such systems has likewise become increasingly complex. For example, the automation of a complicated business system may require the integration of multiple IT (information technology) products and/or services from multiple IT vendors. A preliminary step of providing such a solution involves defining the system requirements (e.g., a networked-based accounting system for a worldwide manufacturing company that provide accounts payable, accounts receivable, reporting, etc.). Next, a solution must be designed with various solution components necessary to meet the system requirements, i.e., sets of products, their interactions, associated services, etc., which together will form an integrated solution. An additional aspect of providing such a solution involves identifying and interfacing with component suppliers, who can supply the identified solution components.

Typically, a single "solution provider" does not have the capability of supplying all of the solution components necessary to build a complex system. Accordingly, solution providers have the challenge of matching the best components of their company and their business partners to a customer's system requirements. The identification of the optimum set of components for a solution is complex. A large solution provider may offer hundreds of products and a variety of services. In addition, the provider may have thousands of business partners, with each partner capable of supplying various products and/or services. Within this environment, the selection of a set of products and services for a solution is both human intensive and time consuming. Thus, the products selected may not necessarily form the best solution, be available by the preferred supplier, or be priced at the best cost for the customer.

Existing systems for automating the implementation of an integrated solution fail to provide a comprehensive platform that addresses the above-mentioned issues. Namely, no single system exists that can facilitate the identification of products and services that are potential candidates for satisfying system requirements, and provide an interface to seamlessly interact with suppliers to both determine which candidates, among the set of candidates, would best fit the solution to be built, and to obtain the components required for the building of the solution.

U.S. Pat. No. 6,131,087, "Method for Automatically Identifying, Matching, and Near Matching Buyers and Sellers In Electronic Market Transactions," issued to Luke et al. on Oct. 10, 2000, which is hereby incorporated by reference, teaches a computerized method for identifying and matching offer data with solicitation data (i.e., an e-market or exchange). Unfortunately, such existing e-markets fail to address, among other things, an integrated system that also facilitates the designing of a solution, i.e., matching solution components to a set of customer requirements. Accordingly, a need exists for providing a comprehensive platform that can integrate both the process of designing a solution and the process of identifying and interfacing with suppliers of the components that will make up the solution.

SUMMARY OF THE INVENTION

The present invention addresses the above-mentioned problems, as well as others, by providing a comprehensive electronic exchange system and method for forming and procuring an integrated solution to meet a set of requirements. In a first aspect, the invention provides an electronic exchange for fulfilling an integrated solution, comprising: a matching system for matching user requirements with a set of candidate components that can fulfill the integrated solution; and a supplier exchange system for interfacing with suppliers of the set of candidate components.

In a second aspect, the invention provides a program product stored on a recordable medium, the program product comprising: means for matching a set of system requirements with a set of candidate components that can fulfill the system requirements; and means for interfacing with suppliers of the set of candidate components.

In a third aspect, the invention provides an electronic exchange for providing an information technology (IT) solution, comprising: a matching system for matching IT requirements with a set of candidate IT components that are able to provide the IT solution; a supplier exchange system for interfacing with suppliers of the set of candidate IT components; and an exchange catalog for storing information relating to available IT components, including supplier information.

In a fourth aspect, the invention provides a computerized method for forming an integrated solution to meet a set of requirements for a system, comprising: providing a database of solution components, wherein the solution components are associated with supplier data that details at least one supplier capable of supplying each solution component; matching the set of system requirements with a set of candidate components that can form the integrated solution by interrogating the database of solution components; identifying suppliers of the set of candidate components by examining the supplier data associated with the set of candidate components; and interfacing with suppliers of the set of candidate components via a network interface; and selecting a final set of components to form the integrated solution.

In a fifth aspect, the invention provides a computerized method for forming an integrated solution to meet a set of requirements for a system, comprising: providing an electronic exchange that allows entities to communicate over a common platform; receiving a request for information (RFI) from a user to the electronic exchange; posting the RFI to participating suppliers; receiving responses at the electronic exchange from interested suppliers; forwarding the responses to the user; and facilitating additional communications as necessary between the user and the interested suppliers to expedite the identification of candidate components that can fulfill at least one system requirement.

BRIEF DESCRIPTION OF THE DRAWINGS

An exemplary embodiment of the present invention will hereinafter be described in conjunction with the appended drawings, where like designations denote like elements, and.

DETAILED DESCRIPTION OF THE INVENTION

The present invention provides an electronic exchange based upon one or more users interacting with multiple suppliers through a computing system that is accessible by both users and suppliers through a network such as the internet. The functionality within the exchange provides a comprehensive mechanism for designing and procuring an integrated solution. For the purposes of this disclosure, an integrated solution may be defined as any system that requires and utilizes multiple components to solve a business or technical need. In some of the exemplary embodiments described herein, an integrated solution is described with reference to an information technology (IT) application. However, it should be understood that the invention is not limited to IT solutions, and may be applied to other fields (e.g., manufacturing).

It also should be understood that there are no limitations on what defines a user or a supplier within the electronic exchange. For instance, a user may be a buyer, a solution designer, or even a supplier. Similarly, a supplier may be a product or services vendor, a buyer of intracompany products and services, business partners of the user, systems integrators, professional service providers (e.g., insurance, legal), facilities management companies, etc. In an exemplary embodiment, users and suppliers must be certified by (i.e., members of) the exchange in order to participate. Alternatively, the exchange can be open to the public. Additionally, the systems described herein may be implemented as a "many user/many supplier" platform or a "single user/many supplier" platform.

As will be described in more detail below, the electronic exchange of the present invention facilitates the implementation of an integrated solution by allowing a user to perform various functions within a single comprehensive platform, including: (1) matching candidate components that can potentially fulfill the requirements of a desired system; (2) identifying suppliers who can supply the candidate components; (3) interfacing with suppliers to obtain component information (e.g., product specs, price, availability, etc.); (4) selecting a final set of components to form the solution; and (5) interfacing with suppliers to order, arrange for delivery, pay for, finance, etc., the selected components.

Figure 1:
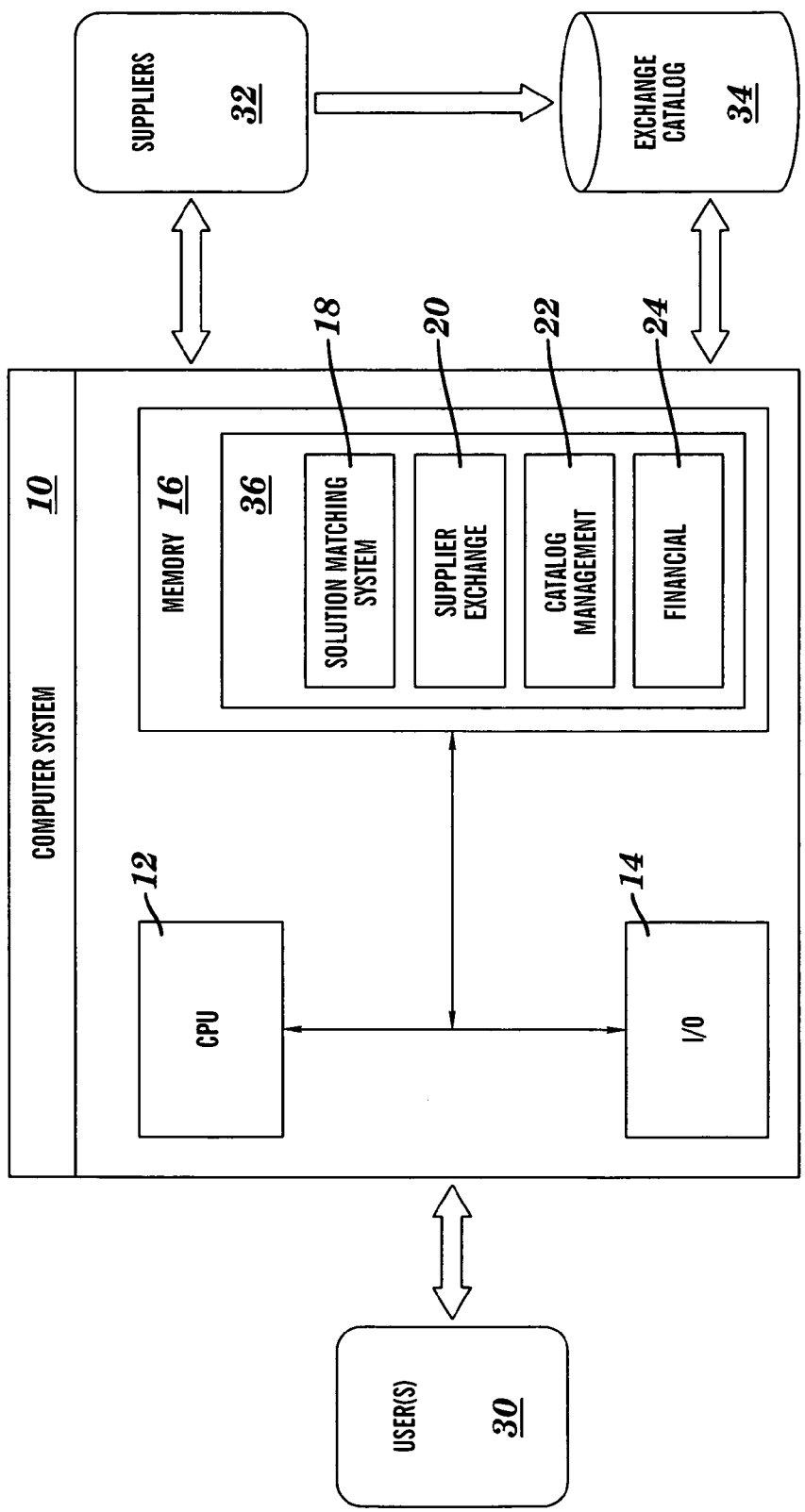
FIG. 1 depicts a block diagram of a computer system implementing an electronic exchange in accordance with the invention.

Referring now to FIG. 1, a computer system 10 implementation of the present invention is shown. Computer system 10 generally comprises a processor 12, input/output (I/O) interfaces 14, memory 16, bus 15, and external devices/resources (not shown). Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. Processor 12 may likewise comprise a single processing unit, or be distributed across one or more processing units in one or more locations, e.g., on a client and server.

I/O interfaces 14 may comprise any system for exchanging information from an external source. External devices that can interface with computer system 10 may comprise any known type of external device, including a CRT, LED screen, hand-held device, keyboard, mouse, voice recognition system, speech output system, printer, facsimile, pager, personal digital assistant, cellular phone, web phone, etc. Bus 15 provides a communication link between the components in the computer system 10 and likewise may comprise any known type of transmission link, including electrical, optical, wireless, etc. In addition, although not shown, additional components, such as cache memory, communication systems, system software, etc., may be incorporated into computer system 10.

Communication with computer system 10 may occur in any known fashion, e.g., a direct terminal connected to the computer system 10, or a remote workstation in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol.

Stored in memory 12 are various software components 36 which, along with exchange catalog 34, provide the electronic exchange that allows a user 30 to match solution components to user requirements and identify/interface with suppliers 32 of the matched components in a comprehensive manner. To implement the necessary functions, the electronic marketplace may include, among other things: a solution matching system 18 for matching user requirements with solution components; a supplier exchange 20 that allows users to interface with suppliers of solution components; an exchange catalog 34 for storing supplier and component information; a catalog management system 22 for inputting, storing and managing catalog data; and a financial services 24 for providing additional accounting and ancillary services.

In addition to listing components and their suppliers, the exchange catalog 34 may include additional information, such as availability, cost, location data, supplier resumes, existing solutions, etc. Exchange catalog 34 may be implemented as a database residing as part of, or externally to, computer system 10. Exchange catalog 34 may include one or more storage devices, such as a magnetic disk drive or an optical disk drive. Alternatively, exchange catalog 34 may include data distributed across, for example, a local area network (LAN), wide area network (WAN), an internet/intranet or a storage area network (SAN) (not shown). Exchange catalog 34 may also be configured in such a way that one of ordinary skill in the art may interpret it to include many disparate storage devices.

Figure 2:
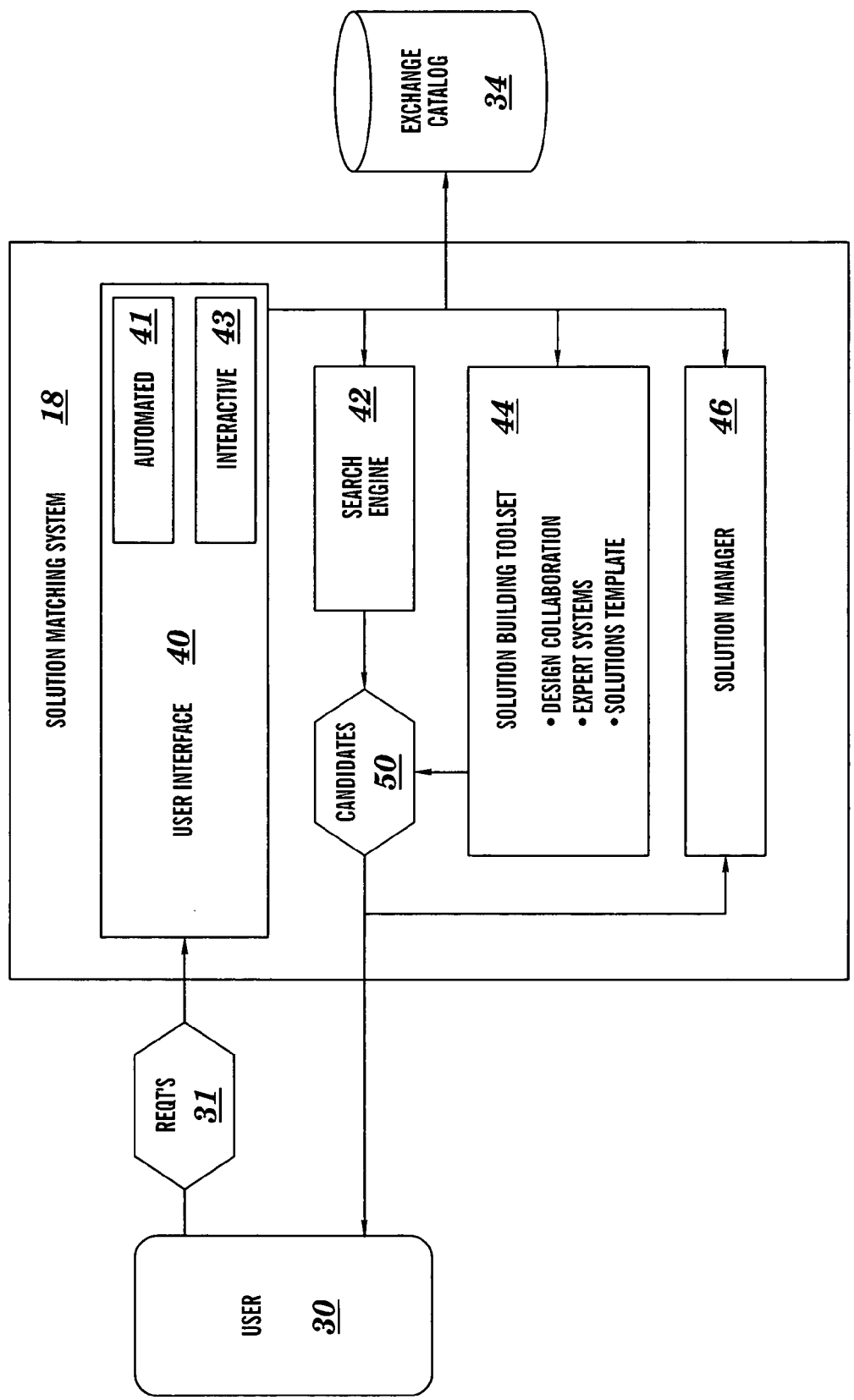
FIG. 2 depicts a block diagram of an exemplary solution matching system in accordance with the invention.

Referring to FIG. 2, a more detailed example of a solution matching system 18 that allows user 30 to match their desired system requirements 31 with a set of candidate components 50 is shown. As can be seen, solution matching system 18 includes a user interface 40 that allows for operation in an automated mode 41 and an interactive mode 43.

When operating in the automated mode 41, various matching functions are provided by matching system 18. For instance, via user interface 40, the user 30 is able to access a catalog search engine 42, a solution building tool set 44, and the exchange catalog 34 itself. Also accessible through user interface 40 is the solution manager 46, which stores and manages data (e.g., a solution design, candidate component data, supplier information, etc.) gathered for a particular solution being designed.

The catalog search engine 42 allows the user 30 to enter component parameters or other search terms, e.g., "accounting software," "routers," "mass storage devices," "TCP/IP," "New York data warehouses," etc., and return a list of components or other stored information that meet the inputted criteria. Components identified as being of interest (i.e., candidate components 50) can be returned to the user and/or stored by solution manager 46. Other search mechanisms, such as alphabetical indexes that allow the user to directly access information, may also be included.

In addition to search engine 42, a solution building tool set 44 may be provided to facilitate the process of designing a solution. The tool set may include any type of system that automates and/or facilitates the design process, including design collaboration systems, expert systems, solution templates, etc. For instance, a matching tool may be provided that uses a "solution map," i.e., a topological map or connected graph, to describe and generate a solution. The solution map would identify and tie together all relevant components of the solution (software, hardware, networks, service components, finance components, etc.). The nodes of the "solution map" would contain component characteristics that could vary from very general to very specific. The component characteristics could be used as a search filter for identifying sets of candidate components from the exchange catalog 34, which could be done automatically or manually during the design process. Depending on the specificity of the search, the size of a set of candidate components may vary from very large (e.g., hundreds) and to very small (e.g., one). The candidate components 50 generated by the tool set 44 could be stored by the solution manager 46 and/or outputted to user 30. In addition, as is described below, suppliers of the candidate components can be readily identified so that issues such as availability and price can be manually or automatically checked during the design process.

When operating under interactive mode 43, component matching is expedited by interfacing with potential suppliers. Under many circumstances, the process of matching a solution to a set of customer requirements cannot be entirely automated. For example, a user may not be aware of all of the options for implementing the various requirements of a desired system without first interfacing with one or more suppliers; new components or component characteristics may not be stored in exchange catalog 34 for every supplier; suppliers may not be listed at all in exchange catalog 34; or an exchange may be implemented without a catalog. In these, as well as other cases, the process of identifying and matching candidate components can be achieved in an interactive mode 43.

An exemplary interactive mode 43 operation may function as follows. Consider a case where a user 30 may have a set of system requirements, but is not entirely certain how best to address them. For example, a user 30 may not know what types of services are required to implement an accounting module within an overall system. To determine this, the user 30 can post a "request for information" via the supplier exchange 20 (FIG. 1), which is then made available to all participating suppliers. A set of interested suppliers (i.e., those suppliers that can potentially fulfill the services) can then respond to the post. For instance, a typical response from an interested supplier may state that installation, training, and maintenance services are recommended, and can be provided at a quoted cost. The user may direct a set of follow-up questions to the interested suppliers, e.g., "how is training implemented?" This interaction may continue until candidate components capable of fulfilling a system requirement are identified, and/or a supplier is selected to implement the services. Accordingly, while operating within the interactive mode 43, the user 30 is able to both match components required to implement their solution and identify solution providers.

As an alternative, where there was no automated match between solution components and suppliers, user 30 could post their solution or a portion thereof. In this case, the interactive mode may have logic that forwards different parts of the solution to different suppliers in order to increase the efficiency of the system, e.g., software suppliers only receive posts relating to software, etc. A set of interested suppliers can then respond to the post. Typical responses in this case would be costs or follow-up questions relating to the components.

Figure 3:
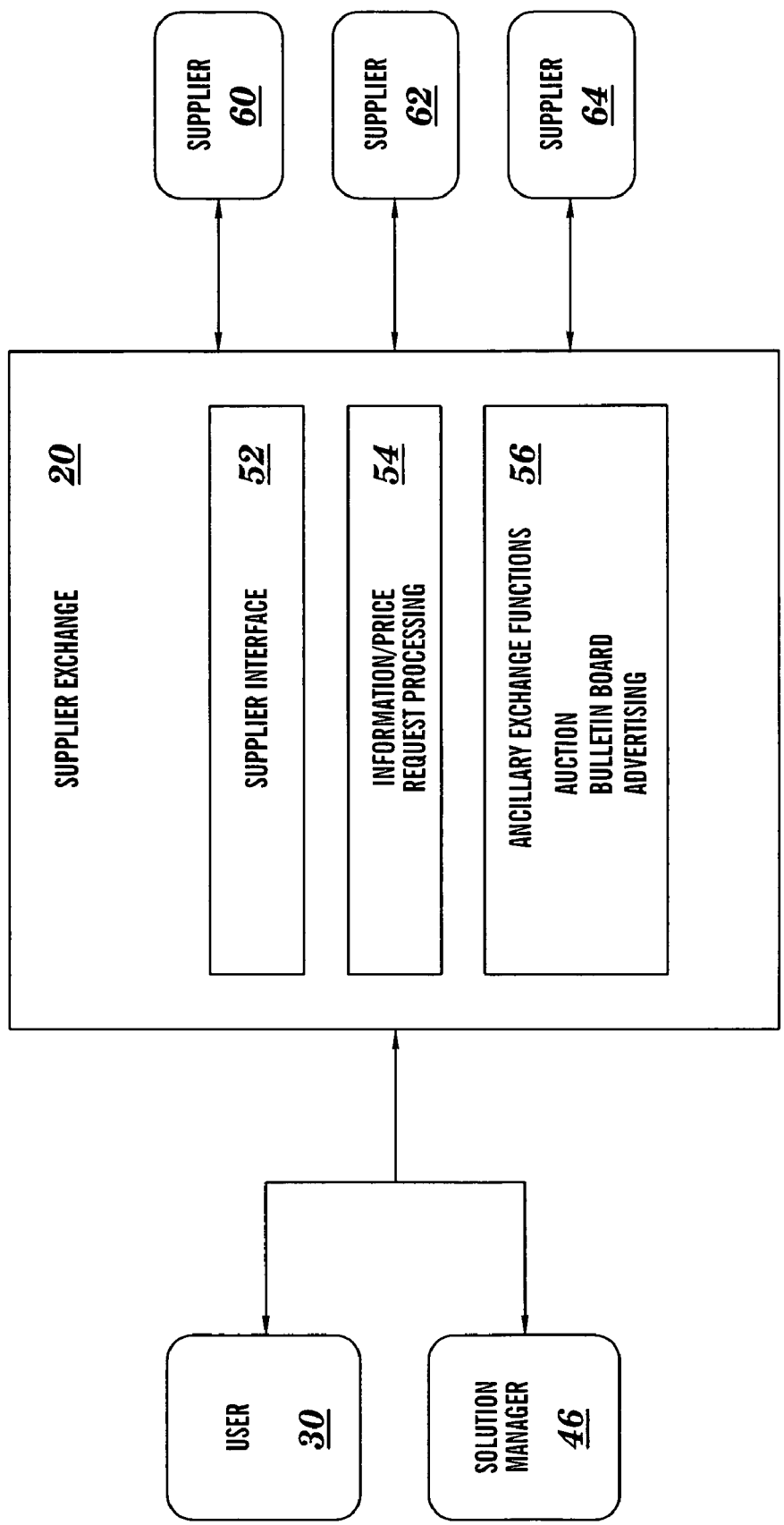
FIG. 3 depicts a block diagram of an exemplary supplier exchange in accordance with the invention.

Referring now to FIG. 3, an exemplary embodiment of supplier exchange 20 is shown comprising a supplier interface 52, an information/price request processing system 54, and ancillary functions 56. Supplier interface 52 provides the communication conduit that allows potential buyers (e.g., user 30, automated design tools, etc.) to contact and interface with potential suppliers 60, 62, 64. The interface may comprise, e.g., a web page with hypertext links to the suppliers, chat rooms, email facilities, order forms, etc. Alternatively, communication with the suppliers may occur automatically by, e.g., the solution manager 46 or some other automated mechanism in order to obtain information, place orders, etc. Supplier interface 52 may also provide the communication conduit that allows suppliers to store their data in exchange catalog 34.

In addition to the communication conduit provided by supplier interface 52, specialized automated mechanisms, such as information/price request processing system 54 may be provided. Information/price request processing system 54 provides a standardized/automated mechanism for a user to obtain predetermined types of data from one or more supplier. For instance, user 30 could fill out an electronic price request form listing various candidate components. Information from the form would then be transmitted to the appropriate suppliers 60, 62, 64, who would then respond to the request. The response information could then be transmitted back to the user and/or automatically stored and processed by the solution manager 46.

After reviewing the responses from the suppliers, the buyer may then select candidates from the original candidate list and make the final selection of products/services best fitting the system requirements. At this point, the buyer could communicate directly with the selected suppliers to finalize the procurement of the components, or utilize the supplier exchange to procure the order.

In addition, supplier exchange 20 may utilize various ancillary exchange functions 56. For example, supplier exchange 20 may include an on-line reverse auction system where bids from multiple suppliers can be placed to fill a user's order. Furthermore, bulletin boards listing special offers from suppliers may be included. Moreover, banner advertisements or the like may be utilized by members of the exchange to drive business their way.

Furthermore, as noted above with reference to the financial services component shown in FIG. 1, the exchange may also contain functions supporting supplier invoicing and payment, or other finance related requirements.

It should be recognized that the use of the exchange could also be applied to any requirement for implementation of a solution. For example, if work on the solution must be accomplished at a particular geographic location, real estate management firms can be linked to the exchange to facilitate the selection of real estate facilities.

It is understood that the present invention can be realized in hardware, software, or a combination of hardware and software. Moreover, computer system 10 according to the present invention can be realized in a centralized fashion in a single computerized workstation, or in a distributed fashion where different elements are spread across several interconnected systems (e.g., a network). Any kind of computer/server system(s)—or other apparatus adapted for carrying out the methods described herein—is suited. A typical combination of hardware and software could be a general purpose computer system with a computer program that, when loaded and executed, controls computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An electronic exchange for fulfilling an integrated solution, comprising:
a matching system that comprises an automatic mode and an interactive mode for matching user requirements for the integrated solution with a set of candidate components comprising a plurality of information technology components, the combination of which can fulfill the integrated solution, the matching system including:
a solution building tool that generates a solution map for identifying the set of candidate components, wherein each of a set of nodes in the solution map includes at least one characteristic of a component required to fulfill the integrated solution; and
a supplier exchange system for interfacing with suppliers of the set of candidate components.

2. The electronic exchange of claim 1, wherein the matching system interfaces with an exchange catalog that contains component data from a plurality of suppliers.

3. The electronic exchange of claim 2, wherein the matching system comprises a search mechanism for searching the exchange catalog.

4. The electronic exchange of claim 2, farther comprising a catalog management system for managing data in the exchange catalog.

5. The electronic exchange of claim 1, wherein the integrated solution comprises an information technology solution.

6. The electronic exchange of claim 1, wherein the supplier exchange system includes an information request system for obtaining component data from a selected supplier.

7. The electronic exchange of claim 1, wherein the supplier exchange system includes a price request system for obtaining price data from a selected supplier.

8. The electronic exchange of claim 2, wherein the exchange catalog includes data selected from the group consisting of: product information, service information, solution information, availability information, location information, and supplier information.

9. The electronic exchange of claim 1, wherein the matching system includes an interactive mode that allows user requirements to be determined by communicating with participating suppliers via the supplier exchange.

10. A program product stored on a recordable medium, the program product comprising:
means for matching a set of system requirements necessary to build an information technology application that comprises an integrated solution with a set of candidate components, wherein the set of candidate components comprises a plurality of information technology components, the combination of which can fulfill the system requirements, wherein the means for matching includes an automatic mode and an interactive mode for matching the set of system requirements with the set of candidate components, and wherein the means for matching further includes:
means for generating a solution map for identifying the set of candidate components, wherein each of a set of nodes in the solution map includes at least one characteristic of a component required to fulfill the integrated solution; and
means for interfacing with suppliers of the set of candidate components.

11. The program product of claim 10, further comprising a database for storing component data from a plurality of suppliers.

12. The program product of claim 11, wherein the matching means comprises search means for searching the database.

13. The program product of claim 11, wherein the matching means comprises a collaborative design system for designing the information technology application.

14. The program product of claim 11, wherein the interface means includes an information request system for obtaining component data from a selected supplier.

15. The program product of claim 11, wherein the interface means includes a price request system for obtaining price data from a selected supplier.

16. The program product of claim 10, further comprising a solution manager for managing solution design data including information relating to the set of candidate components.

17. The program product of claim 10, wherein the matching means includes an interactive mode that allows user requirements to be determined by communicating with participating suppliers via the supplier exchange.

18. An electronic exchange for providing an information technology (IT) solution, comprising:
a matching system that comprises an automatic mode and an interactive mode for matching IT requirements for the IT solution with a set of candidate IT components comprising a plurality of IT components, the combination of which is able to provide the IT solution, the matching system generating a solution map for identifying the set of candidate components, wherein each of a set of nodes in the solution map includes at least one characteristic of a component required to fulfill the integrated solution;

a supplier exchange system for interfacing with suppliers of the set of candidate IT components; and an exchange catalog for storing information relating to available IT components, including supplier information.

19. The electronic exchange of claim 18, wherein the supplier exchange system includes an interface that allows suppliers to store IT component information into the exchange catalog.

20. The electronic exchange of claim 19, wherein the exchange catalog includes data selected from the group consisting of: product information, service information, solution information, availability information, location information, and supplier information.

21. The electronic exchange of claim 18, wherein the matching system includes a search engine for searching the exchange catalog.

22. The electronic exchange of claim 18, wherein the matching system includes at least one solution design tool for facilitating an IT solution design process.

23. A computerized method for forming an integrated solution to meet a set of requirements for a system, comprising:

providing a database of solution components, wherein the solution components are associated with supplier data that details at least one supplier capable of supplying each solution component;

obtaining a solution map that comprises component characteristics for a plurality of information technology components, wherein each of a set of nodes in the solution map includes at least one characteristic of a required information technology component;

automatically matching the set of system requirements with a set of candidate components, the combination of which can form the integrated solution, by interrogating the database of solution components using a solution map, wherein the set of candidate components comprises a plurality of solution components;

identifying suppliers of the set of candidate components by examining the supplier data associated with the set of candidate components; and interfacing with suppliers of the set of candidate components via a network interface; and selecting a final set of components to form the integrated solution.

24. The computerized method of claim 23, wherein the matching step includes the step of entering criteria into a search engine.

25. The computerized method of claim 23, wherein the interfacing step includes obtaining price data from the suppliers.

26. The computerized method of claim 23, comprising the further step of: procuring the final set of components by interfacing with the suppliers via the network interface.

27. A computerized method for forming an integrated solution to meet a set of requirements for a system, comprising:

providing an electronic exchange that allows entities to communicate over a common platform;

receiving a request for information (RFI) from a user of the electronic exchange for an information technology product, the RFI including an inquiry with respect to implementing the information technology product;

posting the RFI to participating suppliers;

receiving responses at the electronic exchange from interested suppliers, each response including a description with respect to implementing the information technology product;

forwarding the responses to the user; and facilitating additional communications as necessary between the user and the interested suppliers to expedite the identification of a plurality of candidate information technology components, the combination of which can form the integrated solution.

28. A computerized method for forming an integrated solution to meet a set of requirements for a system, comprising:

providing an electronic exchange that allows entities to communicate over a common platform;

receiving at least one information technology component for an information technology application from a user of the electronic exchange;

posting the at least one information technology component to participating suppliers;

receiving responses at the electronic exchange from interested suppliers, each response including at least one of a cost for the at least one information technology component or a question regarding the at least one information technology component;

forwarding the responses to the user; and facilitating additional communications as necessary between the user and the interested suppliers to obtain a plurality of information technology components, the combination of which can form the integrated solution.

* * * * *